(12) United States Patent
Hachiro et al.

(10) Patent No.: US 10,484,558 B2
(45) Date of Patent: Nov. 19, 2019

(54) READING APPARATUS, CONTROL METHOD AND STORAGE MEDIUM STORING PROGRAM THEREOF

(71) Applicant: CANON KABUSHIKI KAISHA, Tokyo (JP)

(72) Inventors: Shigeki Hachiro, Yokohama (JP); Kaede Furuichi, Kawasaki (JP); Toshiyuki Kuroda, Yokohama (JP); Syunichi Kunihiro, Kawasaki (JP); Tomofumi Nishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 15/706,332

(22) Filed: Sep. 15, 2017

(65) Prior Publication Data
US 2018/0097954 A1   Apr. 5, 2018

(30) Foreign Application Priority Data
Oct. 3, 2016   (JP) ................................ 2016-195999

(51) Int. Cl.
H04N 1/04       (2006.01)
H04N 1/00       (2006.01)
H04N 1/047      (2006.01)

(52) U.S. Cl.
CPC ..... *H04N 1/00774* (2013.01); *H04N 1/00755* (2013.01); *H04N 1/00758* (2013.01); *H04N 1/00766* (2013.01); *H04N 1/00771* (2013.01); *H04N 1/00827* (2013.01); *H04N 1/00076* (2013.01); *H04N 1/00822* (2013.01); *H04N 1/0476* (2013.01)

(58) Field of Classification Search
CPC ........... H04N 1/00822; H04N 1/00809; H04N 1/00816; H04N 1/00824; H04N 1/00827; H04N 1/40056; H04N 2201/0094; H04N 2201/0098; H04N 2201/0438; H04N 1/00774; H04N 1/00755; H04N 1/00758; H04N 1/00766; H04N 1/00771; H04N 1/00076; H04N 1/0476; H04N 1/02815; H04N 1/00307; H04N 1/04
USPC ................................ 358/497, 474, 475, 509
See application file for complete search history.

(56) References Cited

U.S. PATENT DOCUMENTS

| 4,908,650 | A  | * | 3/1990 | Taniguchi | ............... | G03B 17/08 |
|           |    |   |        |           |                 | 396/268    |
| 4,996,786 | A  | * | 3/1991 | Shoenfeld | ............ | G02B 27/024 |
|           |    |   |        |           |                 | 315/151    |
| 7,131,587 | B2 | * | 11/2006 | He       | ..................... | G06K 7/10732 |
|           |    |   |        |           |                 | 235/454    |

(Continued)

FOREIGN PATENT DOCUMENTS

JP    H07-143340    6/1995

OTHER PUBLICATIONS

Extended European Search Report dated Feb. 16, 2018, in counterpart European Application No. 17001547.3.

*Primary Examiner* — Cheukfan Lee
(74) *Attorney, Agent, or Firm* — Venable LLP

(57) ABSTRACT

When a reading target object that includes a light emitting region is set as a reading target, the light emitting region is detected by a reading mechanism of a reading unit. The reading unit is caused to read the detected light emitting region, and in the reading, a read operation by the reading unit is controlled based on change of an amount of light received from the light emitting region.

21 Claims, 7 Drawing Sheets

(56) References Cited

U.S. PATENT DOCUMENTS

| | | | | |
|---|---|---|---|---|
| 8,547,563 B2* | 10/2013 | Ray | | H04N 1/00307 358/1.13 |
| 8,830,261 B2* | 9/2014 | Asai | | G09G 5/00 345/619 |
| 8,941,894 B2* | 1/2015 | Tanaka | | H04N 1/00806 348/E5.037 |
| 9,025,212 B2* | 5/2015 | Tanaka | | H04N 1/00806 358/474 |
| 9,058,531 B2* | 6/2015 | Slutsky | | G06K 7/10732 |
| 9,122,939 B2* | 9/2015 | Gao | | G06K 7/1095 |
| 9,369,602 B2* | 6/2016 | Mutsuo | | H04N 1/04 |
| 9,514,344 B2* | 12/2016 | Gao | | G06K 7/10861 |
| 9,710,686 B2* | 7/2017 | McQueen | | G06K 7/10722 |
| 9,729,740 B2* | 8/2017 | Sasahara | | H04N 1/0049 |
| 9,930,199 B1* | 3/2018 | Matsui | | H04N 1/401 |
| 10,025,538 B2* | 7/2018 | Ishida | | G06F 3/1289 |
| 2002/0070278 A1* | 6/2002 | Hung | | G06K 7/10702 235/472.01 |
| 2003/0006977 A1* | 1/2003 | Hanari | | G09G 3/3233 345/204 |
| 2004/0239792 A1* | 12/2004 | Shibutani | | G09G 5/00 348/333.12 |
| 2004/0252323 A1* | 12/2004 | Mimamino | | H04N 1/00347 358/1.14 |
| 2007/0001015 A1 | 1/2007 | Suzuki et al. | | 235/472.02 |
| 2008/0231917 A1* | 9/2008 | Tsukahara | | H04N 1/00002 358/475 |
| 2010/0073739 A1 | 3/2010 | Sekiguchi et al. | | 358/474 |
| 2010/0245942 A1* | 9/2010 | Shimatani | | H04N 1/00002 358/475 |
| 2011/0032384 A1* | 2/2011 | Ono | | G11B 27/105 348/231.2 |
| 2011/0229373 A1* | 9/2011 | Asakura | | G01N 21/276 422/63 |
| 2012/0013952 A1* | 1/2012 | Shimizu | | H04N 1/00002 358/448 |
| 2012/0067956 A1* | 3/2012 | Gao | | G06K 7/10792 235/455 |
| 2012/0113449 A1* | 5/2012 | Ray | | H04N 1/00307 358/1.13 |
| 2012/0250108 A1 | 10/2012 | Wilsher et al. | | 358/475 |
| 2013/0248604 A1* | 9/2013 | Coyle | | G06K 7/10752 235/462.15 |
| 2013/0259404 A1* | 10/2013 | Benstock | | G06T 11/60 382/295 |
| 2014/0122648 A1* | 5/2014 | Kang | | H04L 67/1095 709/217 |
| 2014/0160537 A1* | 6/2014 | Tanaka | | H04N 1/00806 358/475 |
| 2014/0160538 A1* | 6/2014 | Tanaka | | H04N 1/00806 358/475 |
| 2014/0337722 A1* | 11/2014 | Asai | | G09G 5/00 715/274 |
| 2015/0161767 A1* | 6/2015 | Monden | | G06T 3/60 345/428 |
| 2015/0312436 A1* | 10/2015 | Mutsuo | | H04N 1/04 358/475 |
| 2016/0048826 A1* | 2/2016 | Fefferman | | G06Q 20/3274 705/23 |
| 2016/0261770 A1* | 9/2016 | Sasahara | | H04N 1/448 |
| 2016/0343306 A1* | 11/2016 | Sasahara | | H04N 1/448 |
| 2017/0085727 A1* | 3/2017 | Sasahara | | H04N 1/0049 |
| 2017/0091503 A1* | 3/2017 | McQueen | | G06K 7/10722 |
| 2017/0294157 A1* | 10/2017 | Sasahara | | H04N 1/0049 |
| 2018/0130390 A1* | 5/2018 | Seto | | G09G 5/003 |
| 2018/0139345 A1* | 5/2018 | Goh | | G03G 15/011 |
| 2018/0165042 A1* | 6/2018 | Ishida | | G06F 3/1289 |
| 2018/0183978 A1* | 6/2018 | Ishida | | H04W 12/06 |

* cited by examiner

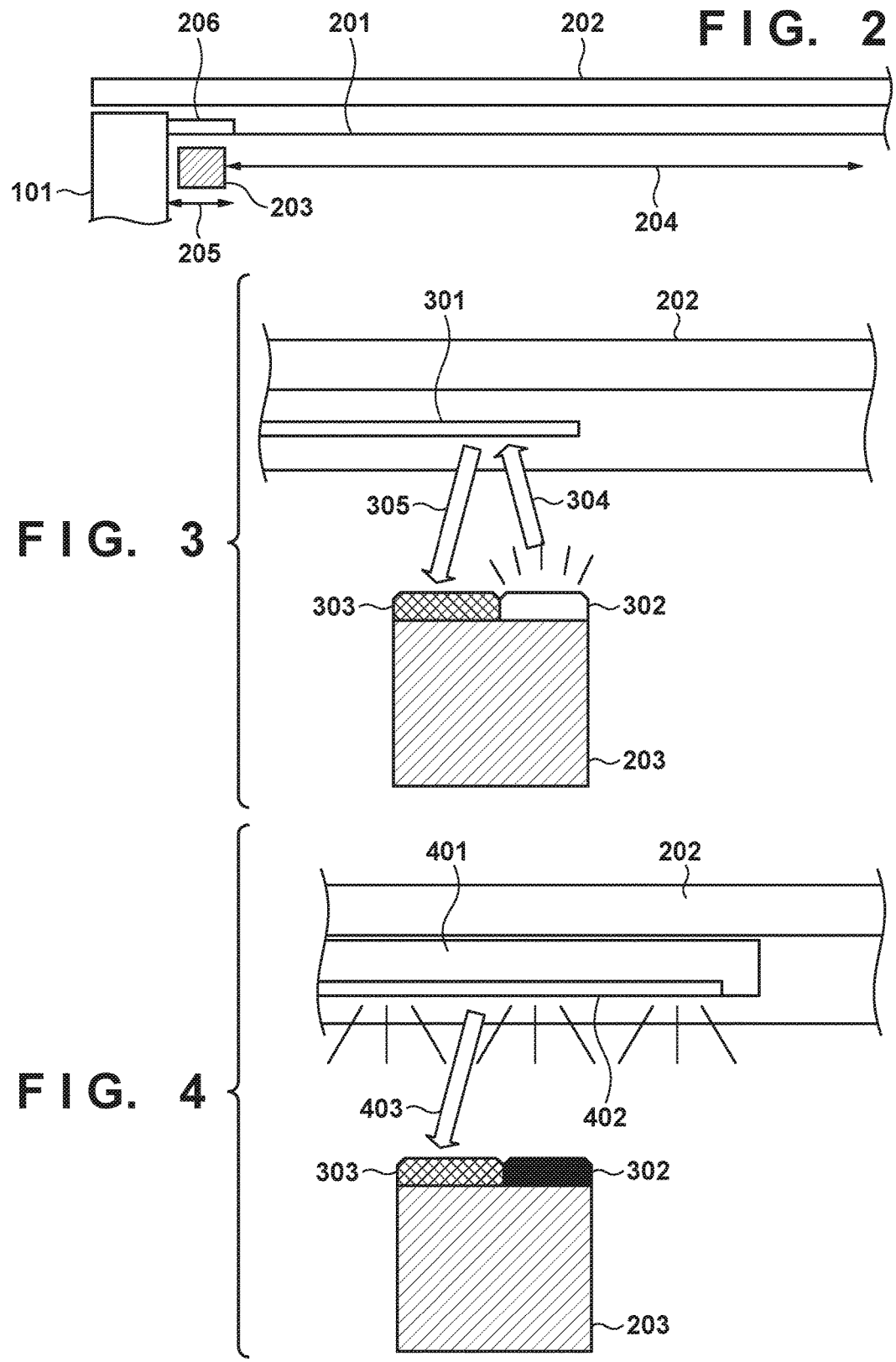

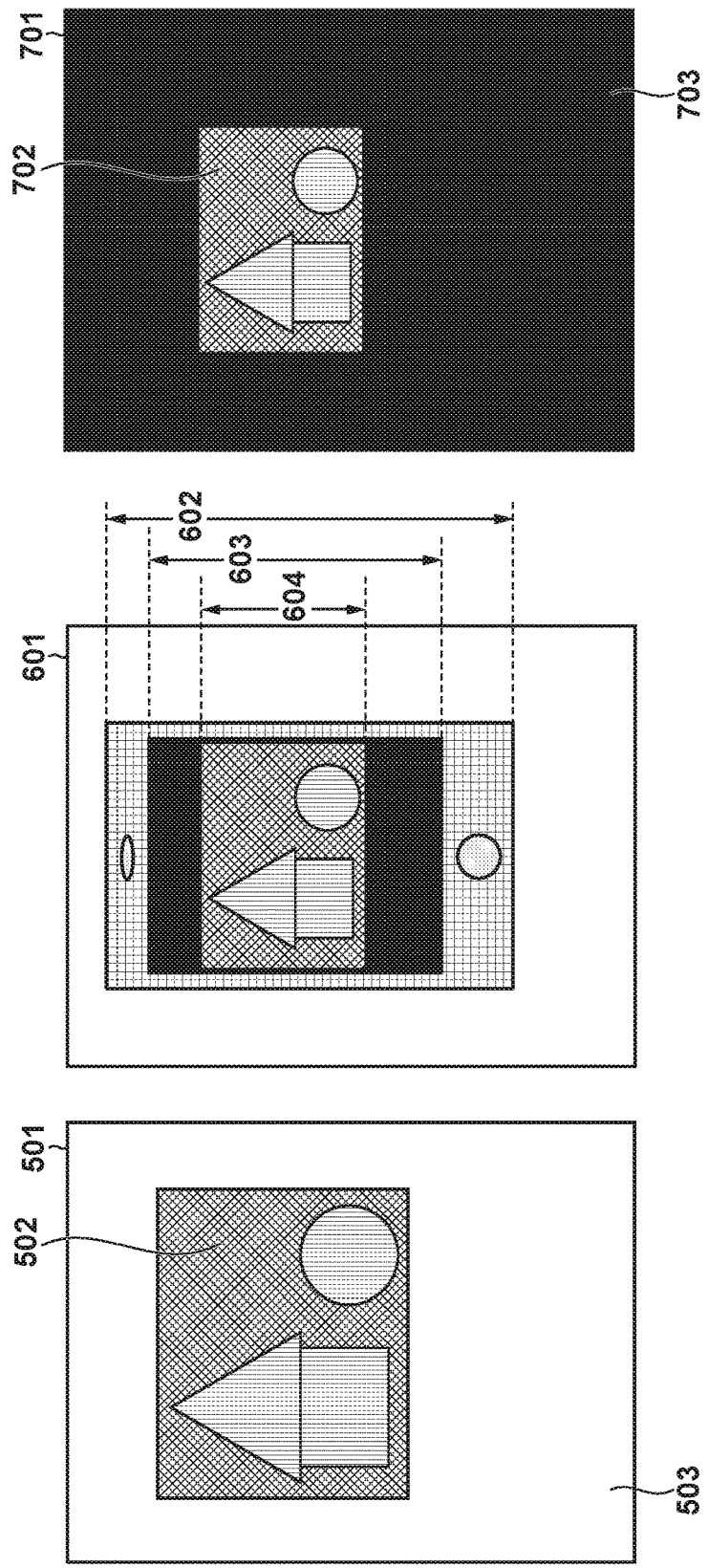

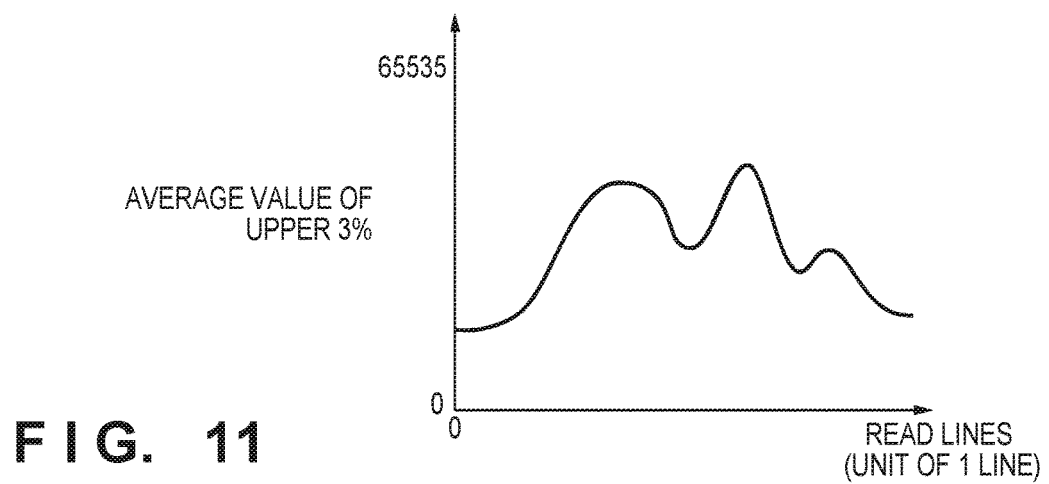
F I G. 11
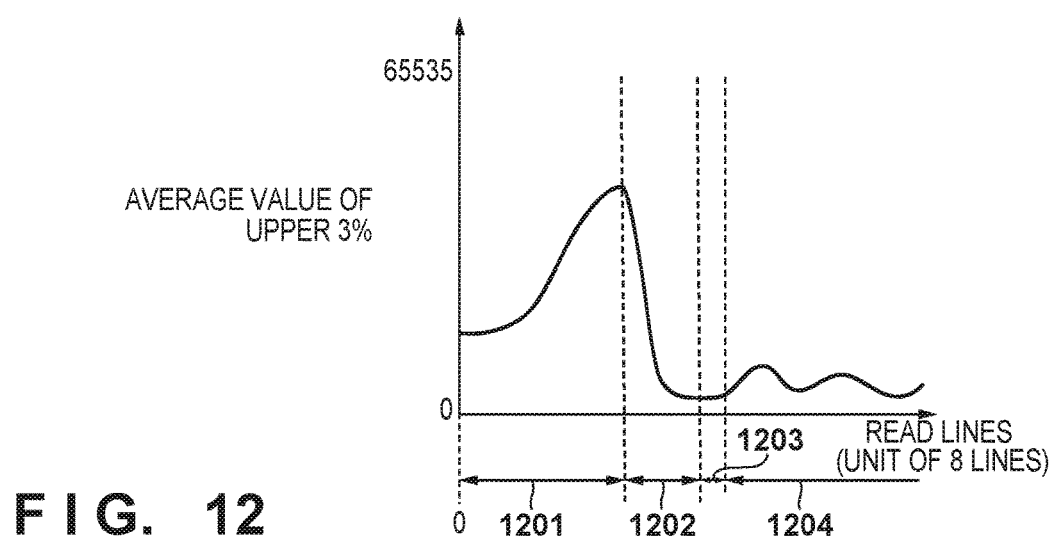
F I G. 12
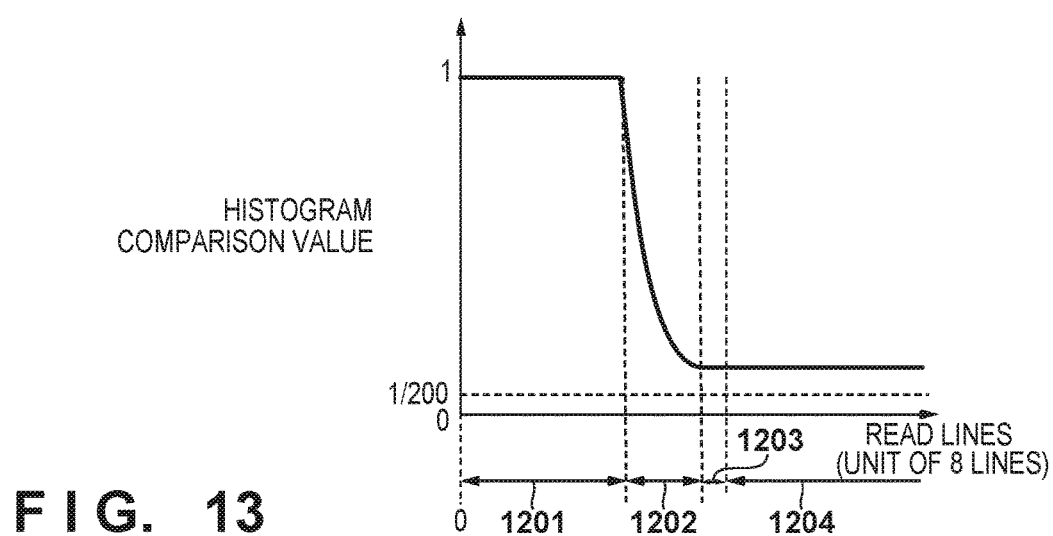
F I G. 13

READING APPARATUS, CONTROL METHOD AND STORAGE MEDIUM STORING PROGRAM THEREOF

BACKGROUND OF THE INVENTION

Field of the Invention

The present invention relates to a reading apparatus for optically reading a reading target object, a control method and a storage medium storing program thereof.

Description of the Related Art

In a conventional reading apparatus such as a scanner apparatus or a copying machine, reading of an image is performed by light from a light emitting unit being reflected or transmitted at a reading target object such as an original and the reflected light being received by a light receiving unit.

Meanwhile, mobile terminals and slim-type PCs in which a liquid crystal display or the like is provided are spreading. A technique of reading an image displayed on such a terminal by a scanner apparatus is known (Japanese Patent Laid-Open No. H7-143340). Japanese Patent Laid-Open No. H7-143340 recites a color image scanner that performs a scan without lighting an illuminant in the case where a display of a reading target is a transmissive type.

In a terminal with a display such as a mobile terminal or a slim-type PC, there are cases where a function for transitioning to a power saving mode after the passage of a predetermined time period in order to suppress battery consumption is set to enabled by a user operation. Typically, in a power saving mode, suppressing power consumption is realized by causing an amount of light of the display to reduce or have the amount of light completely cease by turning the light off.

In a case where a display portion of a terminal that is a reading target is emitting light, scanning is performed by receiving an amount of light of the reading target object which is emitting light, without lighting a light source of the scanner. However, if the terminal that is the reading target enters a power saving mode during reading, a desired image cannot be obtained.

SUMMARY OF THE INVENTION

An aspect of the present invention is to eliminate the above-mentioned problems with the conventional technology. The present invention provides a reading apparatus and a control method for appropriately performing reading in accordance with an amount of light emitted by a reading target object when the reading target object has a light emitting region, and a storage medium storing program thereof.

The present invention in one aspect provides a reading apparatus comprising: a reading unit configured to read a reading target object; and a notification control unit configured to, if an amount of light emitted from a reading target object decreases during reading of the reading target object using the reading unit, execute notification processing relating to the decrease of the amount of light emitted.

By virtue of the present invention, it is possible to appropriately perform reading in accordance with an amount of light emitted by a reading target object when the reading target object has a light emitting region.

Further features of the present invention will become apparent from the following description of exemplary embodiments with reference to the attached drawings.

BRIEF DESCRIPTION OF THE DRAWINGS

FIG. 2 is a view that illustrates a configuration of a periphery of an image sensor unit of a reading apparatus.

FIG. 3 is a view for explaining operation of an image sensor unit.

FIG. 4 is a view for explaining operation of the image sensor unit.

FIG. 5 is a view for illustrating a result of reading a reading target object in an original reading mode.

FIG. 6 is a view for illustrating a result of reading a self-lighting original in the original reading mode.

FIG. 7 is a view for illustrating a result of reading a self-lighting original in a self-lighting original reading mode.

FIG. 11 is a view that illustrates a distribution of signal values at a time of a pre-scan.

FIG. 12 is a view that illustrates a distribution of signal values at a time of a main-scan.

FIG. 13 is a view illustrating change of comparison values of signal values.

DESCRIPTION OF THE EMBODIMENTS

Figure 1:
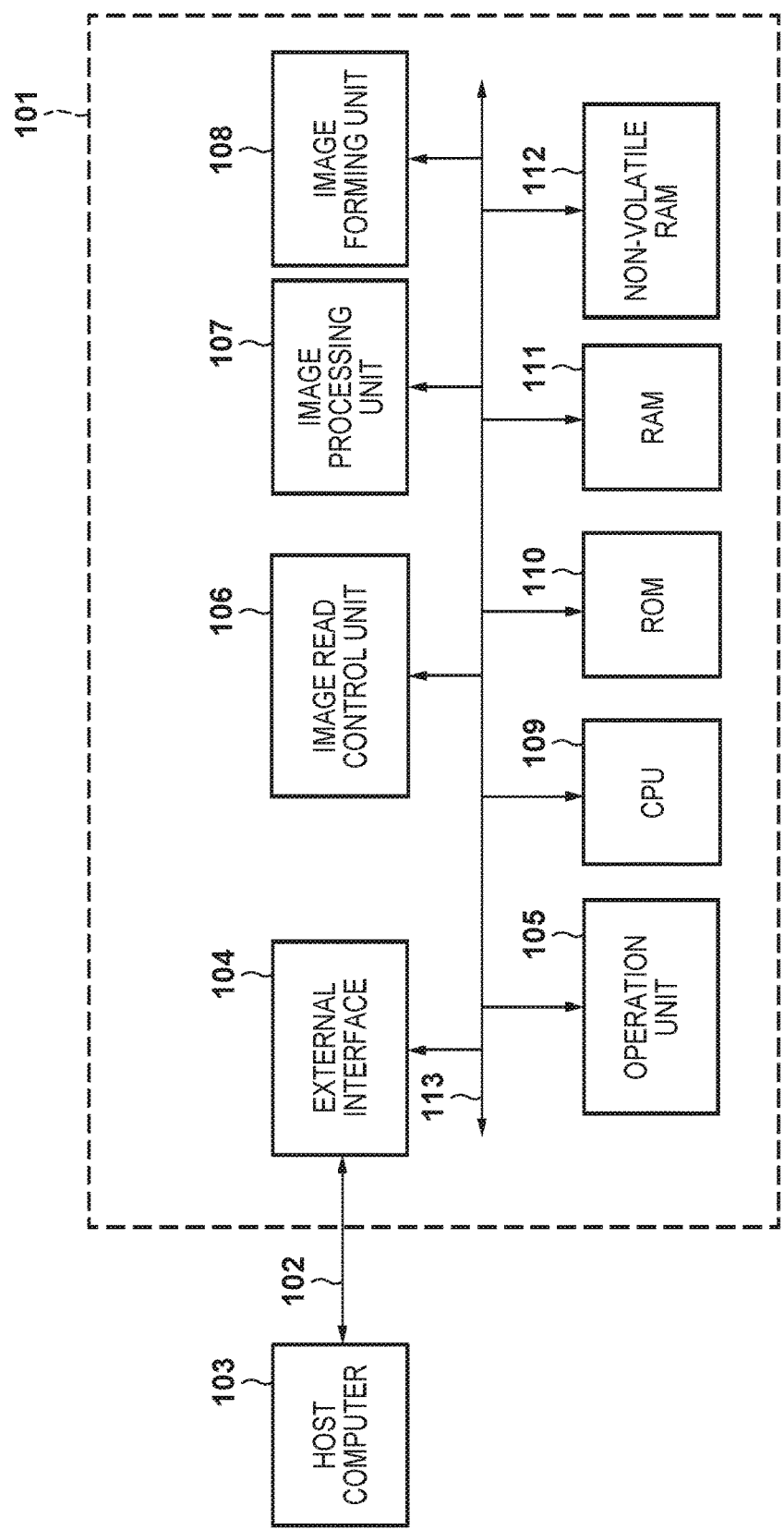
FIG. 1 is a view for illustrating a block configuration of a multifunction peripheral.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

First Embodiment

Explanation is given below regarding a reading apparatus that reads a reading target object (hereinafter referred to as a self-lighting original) that has a light emitting region that emits light by itself, such as a mobile terminal screen. There are cases where a self-lighting original such as a mobile terminal has a function for transitioning to a power saving mode after a predetermined time period elapses in order to suppress battery consumption. Meanwhile, a reading apparatus causes a light source of an image sensor unit that is a reading mechanism to light when reading reflected light from an original, but, when reading a self-lighting original, performs reading by receiving light from the self-lighting original without lighting the light source. Consequently, when a mobile terminal for example transitions to a power saving mode during reading of a self-lighting original, an amount of light of the self-lighting original will decrease or be turned off, and thus it will cease to be possible to appropriately perform reading.

Accordingly, in the present embodiment, a reading apparatus detects change of an amount of light of the self-lighting original, and performs an error notification or a correction of a reading result. In the present embodiment, it is assumed that, after a self-lighting original transitions to a power saving mode, the amount of light will continuously change from when the amount of light starts decreasing until it turns off. Note that, in the present embodiment, recitation is given of an example in which an amount of light changes for a power saving mode, but an objective of a change of an amount of light does not need to be a power saving mode if a self-lighting original performs a similar operation.

FIG. 1 is a block diagram that illustrates an internal configuration of a multi function peripheral 101 in the present embodiment. The multi function peripheral 101 is a so-called MFP (Multifunctional Peripheral) that is an image forming apparatus in which a plurality of functions are integrated, such as a scanning function, a print function, a copy function, and a box function. FIG. 1 illustrates a configuration peripheral to a control unit of the multi function peripheral 101.

The multi function peripheral 101 is mutually communicably connected to an external host computer 103 via an external interface 104 and a network 102. In the case of the present embodiment, the network 102 is configured by a LAN of a wired or wireless medium, or USB (Universal Serial Bus), for example. The host computer 103 is a general-purpose PC, for example, and transmits a job or data to the multi function peripheral 101.

A CPU 109 is a processor that comprehensively controls the multi function peripheral 101. A ROM 110 is a general-purpose ROM, and stores various programs, tables, or fixed data. A program, data and the like for causing the present embodiment to operate are also stored in the ROM 110. A RAM 111 is a general-purpose RAM, and is used as a working memory of the CPU 109. A non-volatile RAM 12 is a rewritable memory for which stored data is not volatile even if a power supply is turned off, and thus is used in a case of permanently storing data.

An operation unit 105 includes a panel or a hardware key, and accepts a setting operation or a function execution instruction from a user. In addition, the operation unit 105 displays various user interface screens, such as a setting screen or a warning screen.

An image read control unit 106 controls operation of an image sensor unit. The image sensor unit includes an RGB light source, for example, that irradiates light onto an original that is set onto an original platen, and a light receiving unit in which light receiving devices that receive light reflected from the original and perform light source conversion are arrayed. The image read control unit 106 performs an A/D conversion on an analog electrical signal obtained by the image sensor unit, and also performs a correction in accordance with characteristics of the image sensor unit. In addition, there are cases where the image read control unit 106 performs a DMA (direct memory access) transfer to store digital image data (hereinafter referred to as image data) in the RAM 111.

An image processing unit 107 reads image data stored in the RAM 111, and performs image processing or correction processing based on an apparatus state or a user setting, conversion processing for a conversion to a format that can be processed by a processing unit of a latter stage such as printing, or the like. In addition, the image processing unit 107 reads image data stored in the RAM 111, and performs encoding processing that uses JPEG or another encoding method, decoding processing for encoded data, or the like.

An image forming unit 108 includes a print engine that supports methods of printing such as an ink-jet printing method or an electrophotographic method. The image forming unit 108 print an image based on image data onto a print sheet (a printing medium) fed from a tray configured in the multi function peripheral 101.

In a case of using the multi function peripheral 101 as a scanner (for example, a push scan), firstly an original set on the original platen is read by the image sensor unit of the image read control unit 106, and an analog electrical signal is generated. The image read control unit 106 then performs an A/D conversion and a correction, and stores a digital electrical signal as image data in the RAM 111. The image processing unit 107 performs JPEG encoding on the image data stored in the RAM 111, and stores the encoded data in the RAM 111 again. The CPU 109 then transmits the encoded data to the computer 103 via the external interface 104 and the network 102. In the case of a push scan, the computer 103 is set in advance as a transmission destination for image data in the multi function peripheral 101.

In a case of using the multi function peripheral 101 as a copy device for executing a copy function of a single-sided original, it is the same as the explanation of the case of using the multi function peripheral 101 as a scanner described above up until the encoded data is stored in the RAM 111. The image processing unit 107 then decodes the encoded data, performs image processing on the image data as necessary, and the image forming unit 108 forms an image, in accordance with a printing method, based on image data with respect to a first surface of the original.

FIG. 2 is an overview cross-sectional view from the viewpoint of a side of a configuration of a periphery of an image sensor unit 203 of the multi function peripheral 101 in the present embodiment. In the image sensor unit 203, a light source and a light receiving unit are arranged to extend in a main scanning direction (a direction orthogonal to the drawing). An original platen 201 is a transparent plate (a platen glass) on which to set an original. A scanner cover 202 is a cover that opens and closes, and a face that is on a side of the original platen 201 is configured by a white reference plate. In a case of reading an original, by setting a read surface of the original to face the original platen 201, and a user closing the scanner cover 202, light from outside is blocked. The scanner cover 202 may be an auto document feeder (ADF: Auto Document Feeder) that consecutively feeds originals on a reading unit of the image sensor unit to perform so-called flow-reading. The image sensor unit 203 is controlled by the image read control unit 106, is capable of round-trip movement in a secondary scanning direction represented by an arrow symbol 204 in the drawing, and is positioned at a standby position 205 when not during a read operation. A calibration sheet 206 is a sheet for obtaining data that is a white reference the image sensor unit 203 to correct characteristics.

In the present embodiment, the multi function peripheral 101 has an original reading mode that takes a medium (hereinafter may be referred to simply as an original) such as paper as a reading target, and a self-lighting original reading mode that takes a self-lighting original that has a light emitting region such as a mobile terminal or a smart phone as a reading target. It is possible to set which mode to perform reading in when executing a scanning function, and, for example, the mode is set by accepting a mode designation from a user on a scanning function main screen that is displayed on the operation unit 105.

FIG. 3 is a view that illustrates a state in which the multi function peripheral 101 is reading an original 301 in the original reading mode. In FIG. 3, to avoid complexity, a light emitting unit 302 and a light receiving unit 303 out of reading mechanisms in the image sensor unit 203 are schematically illustrated, and detailed configurations such as a configuration for a light-guide portion or a rod lens for example are omitted. In the original reading mode, the light emitting unit 302 emits light, and light is irradiated onto the original 301 by a route 304. Light reflected from the original 301 reaches the light receiving unit 303 by a route 305. The image sensor unit 203 generates image data based on a signal received by the light receiving unit 303. Because an original platen 201 side of the scanner cover 202 is a white reference plate, if the image sensor unit 203 passes over a region in which the original is not present, light reflected by the white reference plate of the scanner cover 202 reaches the light receiving unit 303, and image data that indicates white is generated.

FIG. 4 is a view that illustrates a state in which the multi function peripheral 101 is reading a self-lighting original 401 in a self-lighting original reading mode. As illustrated in FIG. 4, in the self-lighting original reading mode, the light emitting unit 302 does not emit light, and the light receiving unit 303 receives light produced from a liquid crystal screen unit 402 of a self-lighting original 401. Generation of image data is the same as in the original reading mode.

FIG. 5 is a view that illustrates a result of reading an original 301 in the original reading mode. A read image 501 includes an original region 502 that is shown in the figure by hatching, and an outside-original region 503 which is the region other than that. As illustrated in FIG. 5, it is possible to identify, by image processing, a region in the original 301, and a region other than the original where the white reference plate of the scanner cover 202 was read.

FIG. 6 is a view that illustrates a result of reading the self-lighting original 401 in the original reading mode. A read image 601 includes a region 602 that includes a region other than the liquid crystal screen unit 402 of the self-lighting original 401, a liquid crystal screen region 603 that includes a region other than an image region (light emitting region) 604 of the self-lighting original 401, and the image region 604. Comparing with the case of FIG. 5, complicated image processing is necessary to identify and extract the image region 604 from this plurality of regions.

FIG. 7 is a view that illustrates a result of reading the self-lighting original 401 in the self-lighting original reading mode. In the self-lighting original reading mode, because the light emitting unit 302 does not emit light, in a read image 701, an image region 702 that emits light and the region 703 other than that are clearly separated. As a result, it is possible to extract a valid image that is a reading target by image processing that is comparatively simple in comparison to the case of FIG. 6.

The multi function peripheral 101 in the present embodiment can switch whether to operate in the self-lighting original reading mode or operate in the original reading mode, in accordance with a user operation via the operation unit 105. In addition, in the present embodiment, when the self-lighting original reading mode is set the multi function peripheral 101 obtains image data with a bit depth of 16 bits per one color (65536 tones) for a read pixel, and performs pixel value correction (described later) in accordance with change of an amount of light of the self-lighting original. Subsequently, image data having a bit depth of eight bits per one color (256 tones) is output as a reading result. By such a configuration it is possible suppress a degradation of image quality due to correction processing.

Explanation is given below regarding reading processing in the self-lighting original reading mode. In the present embodiment, it is assumed that the self-lighting original 401 is a terminal apparatus that has an LCD screen for example, and has a function for transitioning to a power saving mode after the passage of a predetermined time period to suppress battery consumption. In the present embodiment, it is assumed that the power saving function of the self-lighting original 401 is a function that decreases an amount of light of a screen when there is no operation for a time period set by a user, and completely turns off when there is no operation in a further 10 seconds. Because the multi function peripheral 101 performs reading by causing the image sensor unit 203 to move, when the self-lighting original 401 transitions to the power saving mode during reading, the image that is read will become dark part way through, and a reading result will be inappropriate. By virtue of the present embodiment, by executing processing that is illustrated in FIG. 8, it is possible to prevent a reading result from becoming an inappropriate image that is not desired by user, even if the self-lighting original 401 transitions to the power saving mode during reading.

Figure 8:
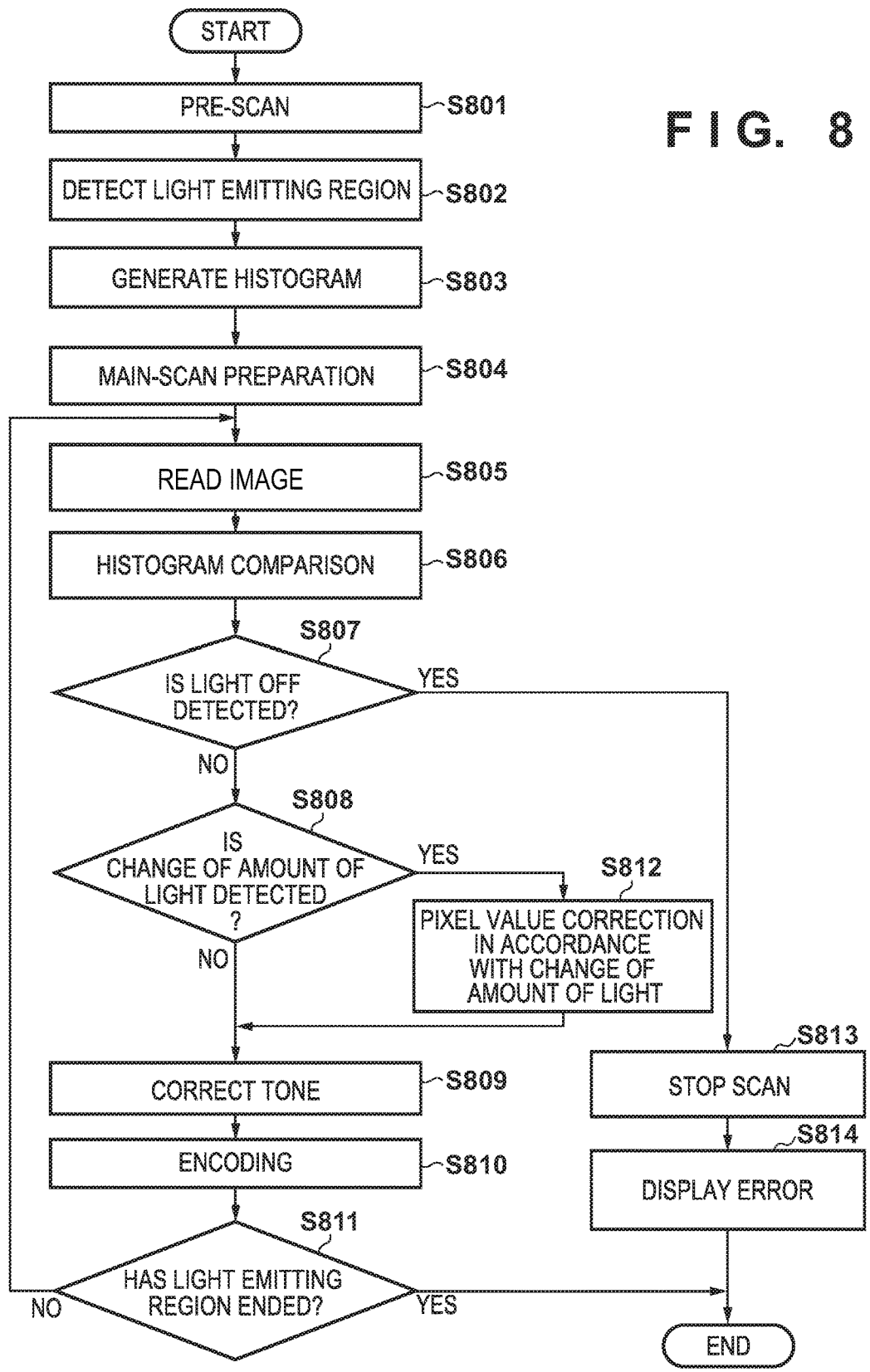
FIG. 8 is a flowchart that illustrates reading control processing.

FIG. 8 is a flowchart that illustrates reading control processing in the self-lighting original reading mode. The processing of FIG. 8 is realized for example by the CPU 109 reading a program stored in the ROM 110 into the RAM 111 and executing it. When the scanning function and the self-lighting original reading mode are selected on the main screen of the multi function peripheral 101 and a scan execution button of the operation unit 105 is pressed, the processing of FIG. 8 is started.

In step S801, the CPU 109, in accordance with the image read control unit 106, reads the entire surface of the original platen 201 at a read resolution, for example 75 dpi, that is lower than a read resolution in step S805 that is described later. In the present embodiment, an operation to read the entire surface of the original platen 201 firstly at a low read resolution in this way is referred to as a pre-scan. The pre-scanned image data (pre-scan image data) is stored in the RAM 111. In the pre-scan, reading speed is prioritized over image quality because extracting the position of the image region 702 is an objective.

In step S802, the CPU 109, by the image processing unit 107, extracts a coordinate position of the image region 702, which is a light emitting region, from the pre-scan image data stored in the RAM 111. In step S803, the CPU 109, by the image processing unit 107, extracts the image region 702 from the pre-scan image data by cropping or the like. The CPU 109 then creates a histogram that indicates a distribution of pixel values for each line read in the image region 702. In the present embodiment, for each of the 65536 tones from 0 that is black to a maximum of 65535, pixel values for each of red (R), green (G), and blue (B) are obtained for each pixel, and a histogram that indicates the distribution of these pixel values is created and stored in a storage unit such as the RAM 111.

In step S804, the CPU 109, by the image read control unit 106, causes the image sensor unit 203 to move at high speed to a read start position for the image region 702 extracted in step S802, for example a most upstream position in the secondary scanning direction of the image region 702. Parameters (reading conditions) for image reading such as an A/D conversion coefficient or a driving speed of the image sensor unit 203 are defined by using the histogram created in step S803, and driving of the image sensor unit 203 is started.

In step S805, the CPU 109, by the image read control unit 106, reads a portion of 8 lines of the image region 702 as a predetermined reading unit at a read resolution higher than the read resolution in step S801, for example 600 dpi. In the present embodiment, an operation for reading a desired region at a high resolution in this way is referred to as a main scan. The image data that is main-scanned is referred to as main-scan image data. In the present embodiment, the processing of step S805 through step S811 is repeated for each predetermined read unit. For each reading unit, reading control is performed in accordance with a result of a determination of change of an amount of light received by the light receiving unit 303.

In step S806, the CPU 109, by the image processing unit 107, generates a histogram of the obtained 8 lines of main-scan image data and stores it in a storage unit such as the RAM 111, and performs a comparison with the histogram of the pre-scan image data for corresponding coordinates.

In the present embodiment, an average value of a highest 3% of pixel values is calculated for each color of red (R), green (G), and blue (B) in each of the first histogram and the second histogram. The CPU 109 obtains a ratio of an average value created from the main-scan image data, and an average value created from the pre-scan image data. For example, in step S806, the CPU 109 holds a value obtained by dividing the average value for the main-scan image data by the average value for the pre-scan image data as a comparison value. Note that, in the above example, because a resolution ratio of the pre-scan and the main scan is 1:8, to simplify processing a histogram for 8 lines of the main-scan image data and a histogram for one line of the pre-scan image data are compared. However, another method may be used, and for example configuration may be taken to take a moving average for every 16 lines of the main-scan image data and a moving average for every 2 lines of the pre-scan image data. By such a method it is possible to reduce an influence from noise or a shift of a coordinate position.

In step S807, the CPU 109 judges the comparison value obtained in step S806, and determines whether any value of the color components of the comparison value is smaller than a first threshold. In the present embodiment, it is assumed that the first threshold is $1/200$ for example. Here, when it is determined that any color component value is smaller than $1/200$, it is determined that the self-lighting original 401 has turned off, and the processing proceeds to step S813. Meanwhile, when it is determined that no color component value is smaller than $1/200$, it is determined that the self-lighting original 401 has not turned off, and the processing proceeds to step S808.

In step S813, the CPU 109, by the image read control unit 106, stops the scan and the processing proceeds to step S814. In step S814, the CPU 109 causes the operation unit 105 to display an error message that conveys to a user that processing cannot continue because the self-lighting original 401 has turned off. After step S814, the CPU 109 causes the image sensor unit 203 to move to the standby position 205, and subsequently the process of FIG. 8 ends.

Figure 9:
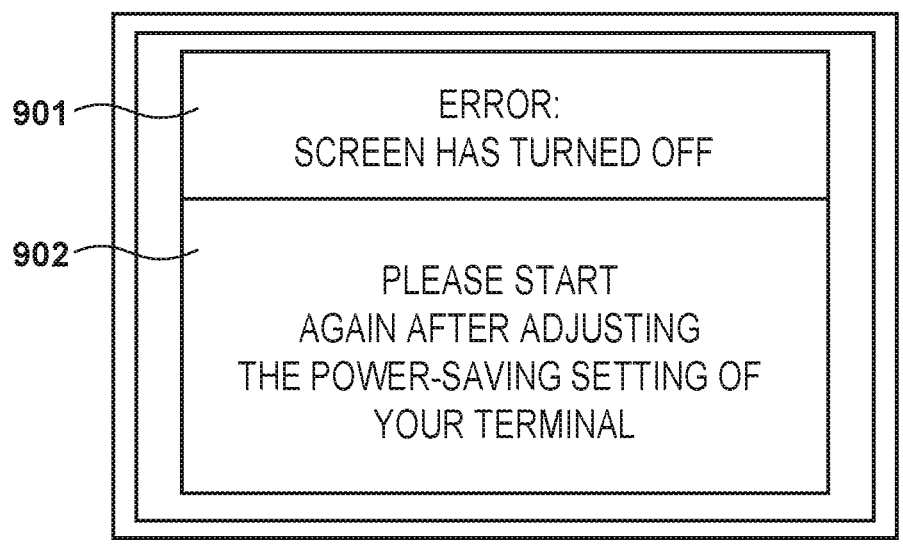
FIG. 9 is a view that illustrates a warning screen.

FIG. 9 is a view that illustrates an error message screen in the present embodiment. A cause of the error is displayed in a region 901 of FIG. 9, and a message prompting a setting change of the power saving mode of the self-lighting original 401 is displayed in a region 902. Because a user cannot see the self-lighting original 401 under the scanner cover 202, they do not know that the self-lighting original 401 has turned off during a read operation. However, in the present embodiment, because a screen as with FIG. 9 is displayed when the self-lighting original 401 turns off, it is possible to redo the scan. In addition, in a case where printing that uses the scanned image data is performed (in other words, a copy), it is possible to prevent wasteful consumption of paper.

Meanwhile, in step S808, the CPU 109 determines whether all values for each color component of the comparison value obtained in step S806 satisfy a condition of exceeding a first threshold and any one value thereof being smaller than a second threshold. In the present embodiment, it is assumed that the second threshold is $9/10$ for example. Here, if it is determined that the condition is satisfied, it is determined that the amount of light of the self-lighting original 401 has changed, and the processing proceeds to step S812. Meanwhile, if it is determined that the condition is not satisfied—in other words that all of the values are greater than or equal to the second threshold—it is determined that the amount of light of the self-lighting original 401 has not changed, and the processing proceeds to step S809. In step S812, the CPU 109, by the image processing unit 107, corrects pixel values in accordance with the change of the amount of light. In the present embodiment, the pixel values are corrected by multiplying the pixel value of each pixel by a reciprocal of the comparison value obtained in step S806.

Next, in step S809, the CPU 109, by the image processing unit 107, performs a tone correction, and corrects the pixel value of each pixel to 256 tones from 0 to 255 for each color component of red (R), green (G), and blue (B). At that time, a white reference correction or a black reference correction may be performed. In step S810, the CPU 109, by the image processing unit 107, performs encoding processing in accordance with JPEG in units of 8 lines. In step S811, the CPU 109 determines whether the reading by the image sensor unit 203 with respect to the image region 702 has ended. The determination of step S811 is performed based on the position of the image sensor unit 203 and the coordinate position of the image region 702 that is extracted in step S802. Here, if it is determined that the reading has not ended, the processing from step S805 repeats. Meanwhile, if is determined that the reading has ended, the CPU 109 causes the image sensor unit 203 to move to the standby position 205, and subsequently the process of FIG. 8 ends.

As described above, by virtue of the present embodiment, it is possible to obtain an appropriate reading result even if the amount of light of the self-lighting original 401 has changed during execution of a main scan or after a pre-scan is executed in step S801 and before executing the main scan.

Explanation of an effect according to this embodiment is given below, taking an example of a case in which it is assumed that a setting for the amount of light of the self-lighting original 401 to decrease is "10 seconds after accepting an operation", and that it takes 5 seconds to perform a main scan of the entire surface of light-emitting surface of the self-lighting original 401. In addition, it is assumed that it takes 3 seconds from the pre-scan of step S801 until the main scan preparation of step S804 completes.

If it takes a user 5 seconds to set the self-lighting original 401 on the original platen 201 and perform an operation for starting reading of the self-lighting original 401, the main scan is executed in step S805 and thereafter, but two seconds later the amount of light of the self-lighting original 401 will decrease. In such a case, because the change of the amount of light is detected in step S808 and pixel correction in accordance with the change of the amount of light is performed in step S812, it is possible to obtain appropriate image data as a reading result.

If it takes a user 15 seconds to set the self-lighting original 401 on the original platen 201 and perform an operation for starting reading of the self-lighting original 401, the amount of light will already be decreasing when the main scan is executed in step S805 and thereafter. In addition, pixel correction is executed in step S812, but two seconds later the self-lighting original 401 will turn off completely. In such a case, because turning off is detected in step S807, the scan is cancelled in step S813, and a warning is notified to a user in step S814. Therefore, even in a case where a copy function that sends read image data to the image forming unit 108 to be printed is executed for example, it is possible to prevent paper or ink from being wastefully consumed.

Second Embodiment

In the first embodiment, an error notification or correction of pixel values is performed when a change of an amount of light of the self-lighting original 401 is detected during reading. In the present embodiment, explanation is given regarding points differing from the first embodiment for another configuration for performing correction considering that an amount of light continuously changes from when the self-lighting original 401 transitions to the power saving mode and the amount of light starts decreasing and until it turns off.

Figure 10:
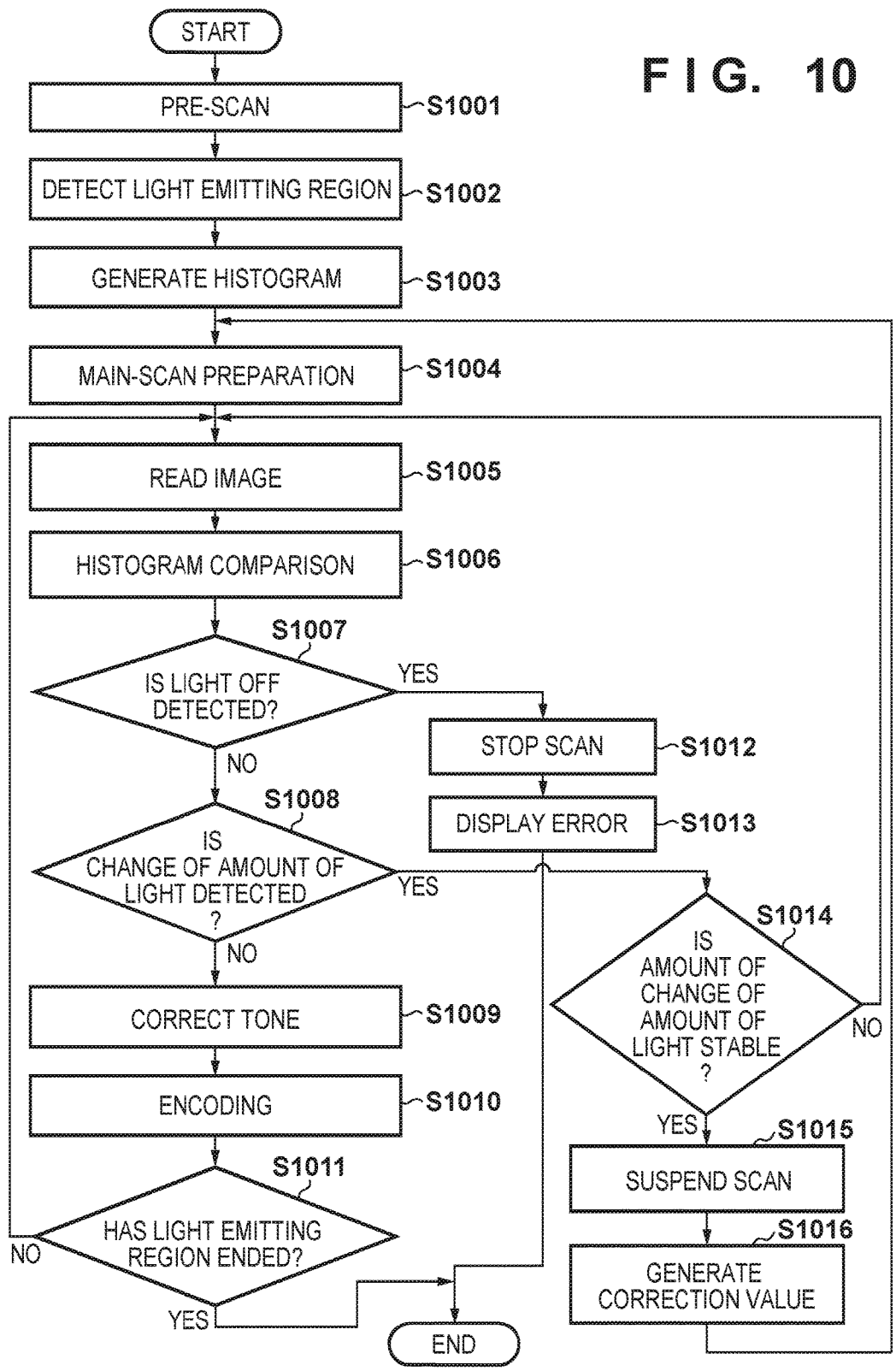
FIG. 10 is a flowchart that illustrates reading control processing.

FIG. 10 is a flowchart that illustrates reading control processing in the self-lighting original reading mode in the present embodiment. The processing of FIG. 10 is realized for example by the CPU 109 reading a program stored in the ROM 110 into the RAM 111 and executing it.

Step S1001 through step S1011 of FIG. 10 are the same as step S801 through step S811 of FIG. 8, and thus explanation thereof is omitted. However, in the present embodiment, in step S1004 a correction value described later is used to correct a parameter (a reading condition) for image reading such as a reading speed or an A/D conversion coefficient. In other words, correction of the parameter for image reading is not performed if step S1004 is executed after the processing of step S1003, but the parameter for image reading is corrected if step S1004 is executed after the processing of step S1017. Detailed explanation is given later.

In step S1008, if it is determined that the condition is satisfied and it is determined that the amount of light of the self-lighting original 401 has changed, the processing proceeds to step S1014. In step S1014, the CPU 109 determines whether the amount of change of the amount of light of the self-lighting original 401 has stabilized. In step S1014, each time this processing is executed, a comparison value of a histogram is held, similarly to the explanation in step S806. The CPU 109 then determines whether the amount of change of the amount of light has stabilized by comparing the comparison value held at a previous time when the processing of step S1014 was executed and a comparison value obtained by the current processing of step S1014. In the present embodiment, if a difference (an amount of variation) between the previous comparison value and the current a comparison value is within a reference range, for example less than 5%, it is determined that the amount of change of the amount of light has stabilized.

If it is determined in step S1014 that the amount of change of the amount of light has not stabilized, the processing from step S1005 repeats. In other words, the processing of step S1005 through step S1008 and step S1014 is repeated until it is determined again in step S1014 that the amount of change of the amount of light has stabilized. If it is determined in step S1014 that the amount of change of the amount of light has stabilized, the processing advances to step S1015.

In step S1015, the CPU 109, by the image read control unit 106, suspends the scan. In other words, in step S1015, if there is encoded data stored in the RAM 111 that was created in step S1009 previously, the CPU 109 discards this encoded data and, by the image read control unit 106, stops the image sensor unit 203.

In step S1016, the CPU 109 uses a histogram for after the amount of change of the amount of light has stabilized to generate a correction value for correcting a parameter for image reading such as an A/D conversion coefficient or a driving speed (a reading speed) of the image sensor unit 203 in step S1004. Subsequently, in step S1004, the CPU 109 sets the correction value generated in step S1016 in the image read control unit 106 to create a parameter for image reading, and redoes the read operation from the start of the self-lighting original 401.

In the present embodiment, for example, if the maximum value of each color component of the comparison value of the histogram is less than ½, a correction value for causing the reading speed after change of the amount of light to decrease to 50% is generated. In addition, a correction value for causing the reading speed after change of the amount of light to decrease to 25% is generated if the maximum value is less than ¼, and a correction value for causing the reading speed after change of the amount of light to decrease to 12.5% is generated if the maximum value is less than ⅛. In other words, in the present embodiment, correction values are generated so as to have four stages of reading speeds. By such a configuration, the image sensor unit 203 can clearly read darker pixels by causing the reading speed to decrease. As a result, it is possible to obtain an appropriate reading result even after the amount of light has decreased. In addition, configuration may be taken to perform a correction that uses a histogram after change of the amount of light has stabilized, in a case where the CPU 109 uses the image processing unit 107 to perform a white reference correction or a black reference correction in step S1009.

FIG. 10, FIG. 11, FIG. 12, and FIG. 13 are used to give an explanation of an effect of the present embodiment below. FIG. 11 is a view that plots an average value of the upper 3% of pixel values for each single line, for the histogram of a red (R) component of the pre-scan image data obtained by the processing of step S1003. FIG. 12 is a view that plots an average value of the upper 3% of pixel values for every 8 lines, for the histogram of a red (R) component of the main-scan image data obtained in step S1006. The abscissa of FIG. 11 and FIG. 12 corresponds to the secondary scanning direction.

Comparing FIG. 11 and FIG. 12, there is no difference between FIG. 11 and FIG. 12 in a section 1201 of FIG. 12, but it is understood that FIG. 12 gets darker in sections 1202, 1203, and 1204 of FIG. 12. Here, it is assumed that there is a similar tendency for the green (G) component and blue (B) component which are not illustrated. A ratio between a value for each line of FIG. 12 and a corresponding value for each line of FIG. 11 is the histogram comparison value for each line.

FIG. 13 is a view that plots the histogram comparison values based on FIG. 11 and FIG. 12. Note that, to simplify the explanation, it is assumed that, for the histogram comparison value, the red (R), green (G) and blue (B) color components are similar values. During the section 1201, because the histogram comparison value exceeds 9/10, it is determined in step S1008 that the amount of light has not changed. In the section 1202, the situation is that the self-lighting original 401 transitions to the power saving mode, and the amount of light of the screen is decreasing.

In the present embodiment, in the section 1202, because it is determined in step S1008 that the amount of light is changing and it is determined in step S1014 that the amount of change of the amount of light has not stabilized, the processing returns to step S1004 and reading processing is continued. In the section 1203, it is determined in step S1015 that the amount of change of the amount of light has stabilized, and reading restarts from the read start position of the image region 702 of the self-lighting original 401.

In the present embodiment, in this way stabilization of the amount of change of the amount of light is temporarily awaited, and when it is determined that the amount of change of the amount of light has stabilized, reading from the read start position of the image region 702 is redone. Therefore, even in a case where there is a feature in that the amount of light changes with time, it is possible to uniformly maintain image quality across an entire surface of the image region 702 because reading is performed by a parameter for uniform image reading across the entire surface of the image region 702. In addition, because it is possible to redo reading after setting a parameter such as a driving speed of the image sensor unit 203 to an optimum, it is possible to obtain an optimal reading result even in a case where the amount of light has significantly decreased to an extent where correction is not possible in image-correction processing of digital data.

In the present embodiment, although explanation was given that reading continues with the image sensor unit 203 remaining where it is caused to move to even in the case where it is determined in step S1014 that the amount of change of the amount of light has not stabilized, another configuration may be used. For example, configuration may be taken to cause the image sensor unit 203 to stop and continue reading the same image after it is determined in step S1008 that the amount of light has changed. In this case, because reading continues from the same position of the image region 702, it is possible to perform the determination of step S1014 by suppressing variation of histogram comparison values that occurs from differences in reading positions. In addition, configuration may be taken to cause the image sensor unit 203 to move to the read start position of the image region 702 immediately after it is determined in step S1008 that the amount of light has changed, and wait for stabilization of the amount of change of the amount of light at that position.

In addition, when the capabilities of the image sensor unit 203 can sufficiently maintain tonality even if the amount of light of the self-lighting original 401 has significantly decreased, there is no need to correct a parameter for image reading. In such a case, configuration may be taken to stop the image sensor unit 203 in the section 1202, and, in the section 1203 or subsequently where the amount of change of the amount of light has stabilized, restart reading from the stopped position or a position back from the stopped position by a distance necessary for acceleration, and then execute correction of pixel values as in step S812 of FIG. 8. In addition, in the present embodiment, although red (R), green (G) and blue (B) pixel values were handled to perform a scan in color, grayscale image data may be generated by reading only luminance values. In such a case, configuration may be taken to handle only a luminance component for a histogram comparison value.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-195999, filed Oct. 3, 2016, which is hereby incorporated by reference herein in its entirety.

What is claimed is:

1. A reading apparatus comprising:
   at least one processor;
   a reading control unit configured to cause a reading sensor to read a reading target object; and
   a display control unit configured to display an error message on a screen,
   wherein the display control unit displays the error message based on a detection of a decrease in an amount of light emitted from the reading target object during reading of the reading target object by the reading sensor in a period from when reading of the reading target object is instructed to when reading of the reading target object is finished, and
   wherein the reading control unit and the display control unit are implemented by the at least one processor.

2. The reading apparatus according to claim 1, wherein the reading control unit is configured to cause a reading speed of the reading sensor to decrease if the amount of light emitted from the reading target object during reading of the reading target object by the reading sensor decreases past a first threshold, wherein, if the amount of light emitted from the reading target object has decreased past a second threshold smaller than the first threshold during reading of the reading target object by the reading sensor, the display control unit displays the error message relating to the decrease of the amount of light emitted from a self-lighting region.

3. The reading apparatus according to claim 2, wherein, if the amount of light emitted from the reading target object decreases past a second threshold during reading of the reading target object by the reading sensor, the reading control unit causes reading processing by the reading sensor to stop.

4. The reading apparatus according to claim 2, further comprising a correction unit configured to correct a result of reading by the reading sensor if the amount of light emitted from the reading target object during reading of the reading target object by the reading sensor decreases past the first threshold, wherein the correction unit is implemented by the at least one processor.

5. The reading apparatus according to claim 1, further comprising a determination unit configured to determine whether the amount of light emitted from the reading target object has decreased, based on a light reception result of the reading sensor, wherein the determination unit is implemented by the at least one processor.

6. The reading apparatus according to claim 5, wherein the determination unit determines whether the amount of light emitted from the reading target object has decreased, based on a first histogram obtained by reading the reading target object at a first resolution by the reading sensor and a second histogram obtained by reading the reading target object at a second resolution higher than the first resolution by the reading sensor.

7. The apparatus according to claim 1, wherein the display control unit displays, as the error message, a message indicating that a screen is turned off.

8. A control method executed in a reading apparatus, the method comprising:

causing a reading sensor to read a reading target object; and displaying an error message on a screen, based on a detection of a decrease in an amount of light emitted from the reading target object during reading of the reading target object by the reading sensor in a period from when reading of the reading target object is instructed to when reading of the reading target object is finished.

9. The control method according to claim 8, wherein a reading speed of the reading sensor is caused to decrease if the amount of light emitted from the reading target object during reading of the reading target object by the reading sensor decreases past a first threshold, and wherein, if the amount of light emitted from the reading target object has decreased past a second threshold smaller than the first threshold during reading of the reading target object by the reading sensor, the displaying step of displaying the error message relating to the decrease of the amount of light emitted from a self-lighting region is executed.

10. The control method according to claim 9, wherein, if the amount of light emitted from the reading target object during reading of the reading target object by the reading sensor decreases past the second threshold, reading processing by the reading sensor is caused to stop.

11. The control method according to claim 9, wherein, if the amount of light emitted from the reading target object has decreased past the first threshold during reading of the reading target object by the reading sensor, a result of reading by the reading sensor is corrected.

12. The control method according to in claim 8, wherein whether the amount of light emitted from the reading target object has decreased is determined based on a light reception result of the reading sensor.

13. The control method according to claim 12, wherein it is determined whether the amount of light emitted from the reading target object has decreased, based on a first histogram obtained by reading the reading target object at a first resolution by the reading sensor and a second histogram obtained by reading the reading target object at a second resolution higher than the first resolution by the reading sensor.

14. The control method according to claim 9, wherein the displaying step displays, as the error message, a message indicating that a screen is turned off.

15. A non-transitory computer-readable storage medium storing a program for causing a computer to operate so as to display an error message on a screen, based on a detection of a decrease in an amount of light emitted from a reading target object during reading of the reading target object by a reading sensor in a period from when reading of the reading target object is instructed to when reading of the reading target object is finished.

16. The non-transitory computer-readable storage medium according to claim 15, wherein a reading speed of the reading sensor is caused to decrease if the amount of light emitted from the reading target object during reading of the reading target object by the reading sensor decreases past a first threshold, and wherein, if the amount of light emitted from the reading target object has decreased past a second threshold smaller than the first threshold during reading of the reading target object by the reading sensor, the displaying step of displaying the error message relating to the decrease of the amount of light emitted from a self-lighting region is executed.

17. The non-transitory computer-readable storage medium according to claim 16, wherein, if the amount of light emitted from the reading target object during reading of the reading target object by the reading sensor decreases past the second threshold, reading processing by the reading sensor is caused to stop.

18. The non-transitory computer-readable storage medium according to claim 16, wherein, if the amount of light emitted from the reading target object has decreased past the first threshold during reading of the reading target object by the reading sensor, a result of reading by the reading sensor is corrected.

19. The non-transitory computer-readable storage medium according to claim 15, wherein whether the amount of light emitted from the reading target object has decreased is determined based on a light reception result of the reading sensor.

20. The non-transitory computer-readable storage medium according to claim 19, wherein it is determined whether the amount of light emitted from the reading target object has decreased, based on a first histogram obtained by reading the reading target object at a first resolution by the reading sensor and a second histogram obtained by reading the reading target object at a second resolution higher than the first resolution by the reading sensor.

21. The non-transitory computer-readable storage medium according to claim 15, wherein in the display of the error message, a message is displayed indicating that a screen is turned off.

* * * * *